(12) United States Patent
Fuchs

(10) Patent No.: US 7,730,739 B2
(45) Date of Patent: Jun. 8, 2010

(54) PORTABLE COOLER WITH BUILT-IN REFRIGERANT CUBES

(76) Inventor: Mark D. Fuchs, 3403 Riviera Ct., Mequon, WI (US) 53092

( * ) Notice: Subject to any disclaimer, the term of this patent is extended or adjusted under 35 U.S.C. 154(b) by 400 days.

(21) Appl. No.: 11/110,179

(22) Filed: Apr. 20, 2005

(65) Prior Publication Data

US 2005/0183446 A1    Aug. 25, 2005

(51) Int. Cl.
*F25D 3/08* (2006.01)
(52) U.S. Cl. .................................... 62/457.7; 62/530
(58) Field of Classification Search ............... 62/457.1, 62/457.2, 457.3, 457.7, 371, 530, 372, 457.4, 62/457.5, 529; 190/107, 109, 103, 104, 105, 190/111, 115, 122, 126, 127; 220/902, 810, 220/361, 315, 4 C, 4 F, 6, 76
See application file for complete search history.

(56) References Cited

U.S. PATENT DOCUMENTS

| | | | | |
|---|---|---|---|---|
| 2,181,074 A * | 11/1939 | Scott | ...................... | 52/404.1 |
| 2,602,302 A | 7/1952 | Poux | | |
| 2,850,391 A * | 9/1958 | Gunsberg | ................ | 426/109 |
| 4,183,226 A | 1/1980 | Moore | | |
| 4,311,022 A * | 1/1982 | Hall | ...................... | 62/457.2 |
| 4,324,111 A | 4/1982 | Edwards | | |
| 4,517,815 A * | 5/1985 | Basso | ...................... | 62/457.5 |
| 4,598,802 A * | 7/1986 | Abenaim | ................ | 190/107 |
| 4,653,290 A * | 3/1987 | Byrne | ..................... | 62/372 |
| 4,700,706 A | 10/1987 | Munch | | |
| 4,705,856 A * | 11/1987 | Biere | ...................... | 546/21 |
| 4,741,176 A * | 5/1988 | Johnson et al. | ........... | 62/457.4 |
| 4,805,749 A * | 2/1989 | Gerch | ...................... | 190/111 |
| 4,931,333 A | 6/1990 | Henry | | |
| 5,005,374 A | 4/1991 | Spitler | | |
| 5,205,448 A * | 4/1993 | Kester et al. | ............. | 224/575 |
| 5,251,460 A * | 10/1993 | DeMarco et al. | .......... | 62/371 |
| 5,351,494 A * | 10/1994 | Jensen et al. | ............. | 62/60 |
| 5,526,907 A * | 6/1996 | Trawick et al. | ........... | 190/111 |
| 5,570,588 A | 11/1996 | Lowe | | |
| 5,887,770 A * | 3/1999 | Covell | ..................... | 224/153 |
| 6,068,402 A | 5/2000 | Freese et al. | | |
| 6,116,045 A * | 9/2000 | Hodosh et al. | ............ | 62/457.4 |
| 6,151,910 A * | 11/2000 | Hazen | ..................... | 62/457.2 |
| 6,183,133 B1 * | 2/2001 | Roegner | .................. | 383/39 |
| 6,910,560 B2 * | 6/2005 | Dulin | ...................... | 190/109 |
| 6,925,834 B2 * | 8/2005 | Fuchs | ...................... | 62/457.2 |
| 2002/0189278 A1 * | 12/2002 | Defelice et al. | .......... | 62/457.2 |

* cited by examiner

*Primary Examiner*—Mohammad M Ali
(74) *Attorney, Agent, or Firm*—Absolute Technology Law Group, LLC

(57) ABSTRACT

A portable cooler having one or more ice sheets including built-in refrigerant cubes. The cooler comprises an outer fabric shell and one or more sets of spaced apart refrigerant cubes encapsulated in plastic to form ice sheets that are attached to the interior walls of the cooler. The walls of the cooler may also include one or more layers of thermal insulation. The ice sheets provide a visually pleasing appearance to the inside of the cooler suggestive of cooling effects. The ice sheets may be retained along the walls of the cooler by seams sewn along the lanes passing between the refrigerant cubes, by being retained in pockets formed by sidewall liners or by being secured into chambers defined by the cooler's outer walls and a plastic insert fitted into the cooler. The cooler may include a hinged top and bottom that can be folded flat for allowing the cooler to assume a compact configuration during storage or freezing of the refrigerant cubes.

4 Claims, 10 Drawing Sheets

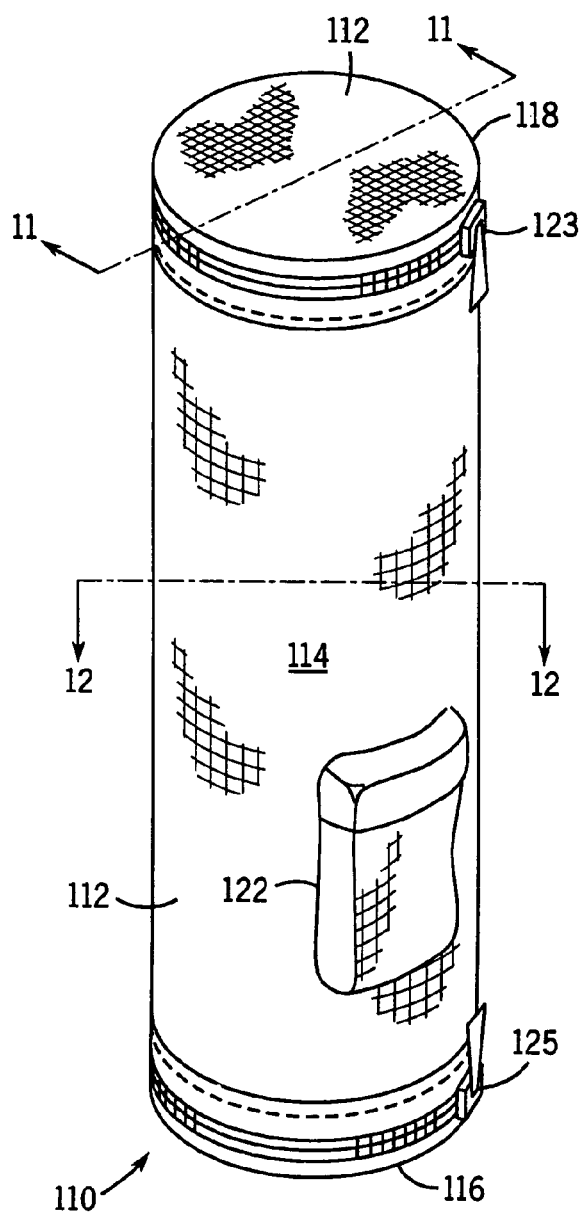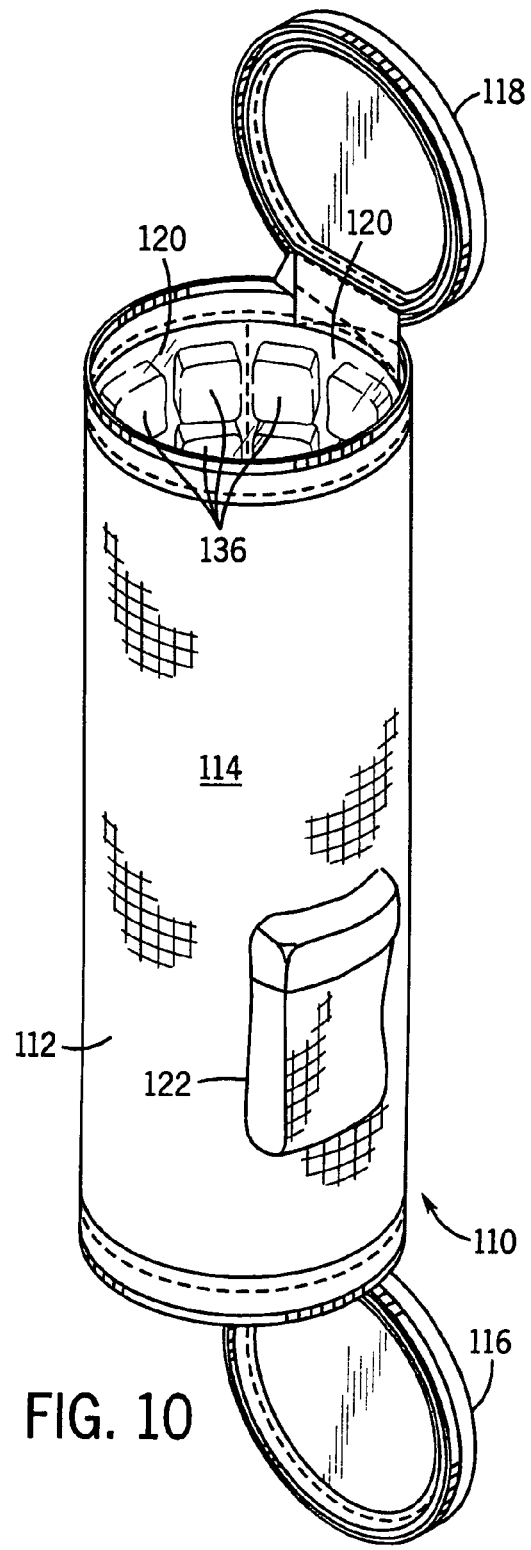
FIG. 9
FIG. 10

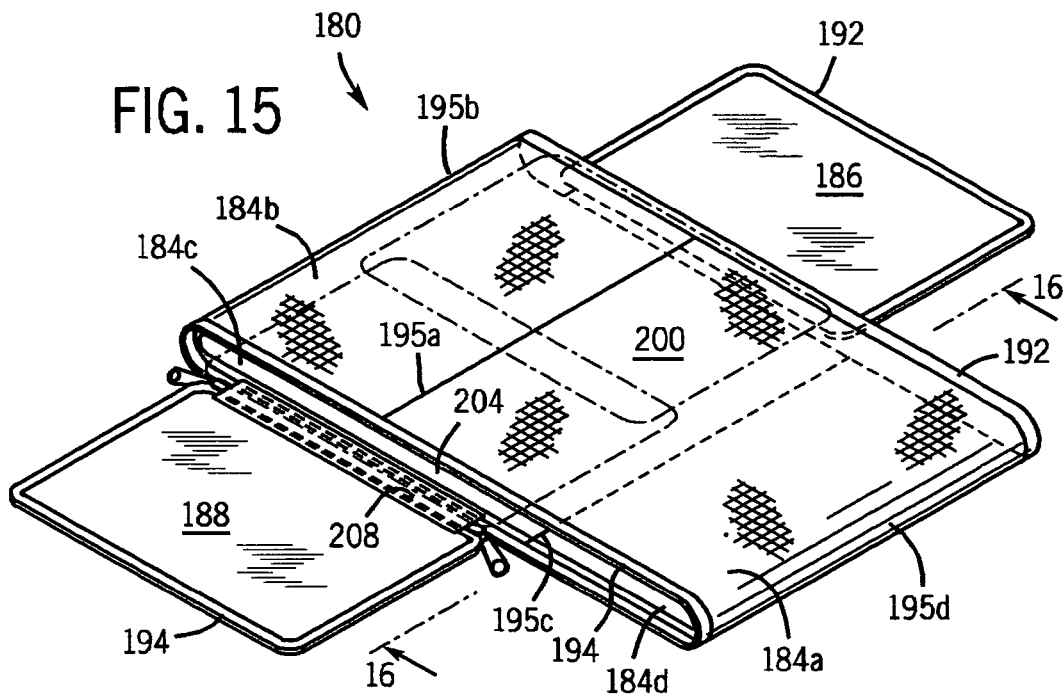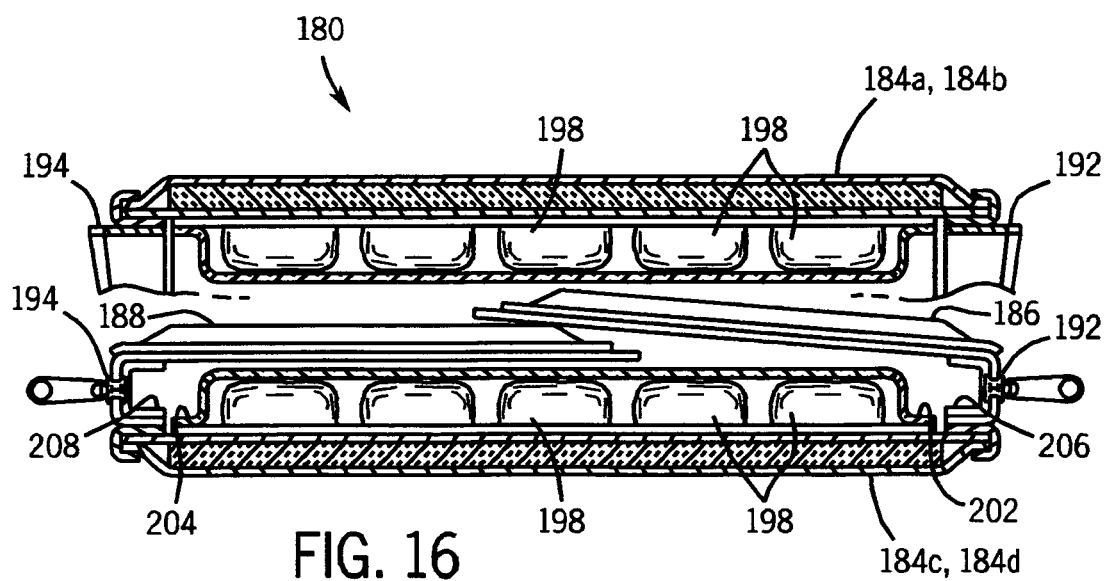

PORTABLE COOLER WITH BUILT-IN REFRIGERANT CUBES

CROSS REFERENCE TO RELATED APPLICATIONS

This application claims the benefit of U.S. patent application Ser. No. 10/661,044 filed on Sep. 13, 2003, which is incorporated herein by reference.

BACKGROUND OF THE INVENTION

The present invention relates to portable coolers for foodstuffs, beverages and other articles such as biological tissue specimens and temperature sensitive chemicals and pharmaceuticals. More specifically the present invention relates to portable coolers that provide refrigerant as a built-in part of the cooler itself and to wall constructions for coolers that allow sheets of refrigerant cubes to be incorporated into the structure of the cooler itself.

Many types of portable coolers and ice chests exist that are designed for allowing food and beverages to be kept chilled for limited periods. Some coolers have a hard shell of molded plastic that gives them a rigid construction. Other types of coolers feature exterior layers of tough but pliable fabric that are sewn together to form a more flexible containment structure. Many portable coolers are used simply to provide thermal insulation and keep their contents cool by protecting against rapid heating. Unfortunately, under warm conditions these types of coolers can at most keep their contents cool for short periods of time on the order of two or three hours. Most coolers are used with blocks or cubes of ice or frozen gel solution that are usually encapsulated in plastic containers or in small polyvinyl packets. These containers or packets of freezable material are separate and removable from the coolers and are usually purchased as separate products. Prior to use the containers or packets are placed in a freezer until they become frozen solid. When placed in a cooler these frozen materials actively cool and chill the contents of the cooler as they absorb heat energy corresponding to their heat of fusion and low starting temperature. This approach can provide more long lasting effects and can even cool down beverages and food which start at room temperature. However, the containers and packets of freezable material can be inconvenient and awkward to handle and position within the cooler and can take up a lot of otherwise usable space within the interior of the cooler if they are not designed to compactly fit within the cooler.

Portable coolers are designed to be simply and easily manufactured while providing the greatest amount of cooling possible and at the same time to be as convenient to use and as visually appealing to the consumer as possible. Some existing patents exemplify current designs and illustrate the prior art pertinent to the present invention.

U.S. Pat. No. 4,324,111 to Edwards entitled Freezing Gel Containment Structure and Method provides an active cooling structure composed of adjacent plastic tubes of encapsulated freezing gel that form rigid panels for surrounding a bottle or the like. The tubes may be encased in decorative covers but the tubes and covers are not formed into closed containment structures.

U.S. Pat. No. 4,183,226 to Moore entitled Refrigerated Beverage Holder similarly describes a cylindrical sleeve of reusable refrigerant in the form of ice packs shown as elongated sealed sections of plastic. The sealed sections or bars of encapsulated refrigerant are disposed within the beverage can holder along the interior of its outer insulated wall in the space between the beverage can and the holder. The beverage can holder may include inner walls defining an annular section for containing the refrigerant.

U.S. Pat. No. 5,570,588 to Lowe entitled Freezable Insert Cooler provides a rigid molded plastic cooler body having a rectangular shape and including hollow perimeter sidewalls. A freezable gel pack insert is positioned within one or more of the hollow perimeter sidewalls and is removable so that it can be conveniently frozen apart from the cooler. The gel pack is described as being constructed of heat sealed webs that may include integral hinges.

U.S. Pat. No. 4,311,022 to Hall entitled Foldable Ice Pack provides a ice pack having a large number of separate refrigerant containing compartments within a multiple layered wall assembly of foldable plastic sheet material. The outer walls of the assembly are intended to help control the accumulation of condensation. The inner walls are heat sealed between adjacent compartments to define the compartments and form webbing strips between them. Among other things, the ice pack is described as being used with ice chests and lunch boxes.

U.S. Pat. No. 4,700,706 to Munch entitled Cold and Warm Pack For Physiotherapy And The Like describes a sleeve composed of two layers of flexible foil that are bonded together. One layer of foil is planar while the other defines cups and flanged edges. The cups are filled with special temperature storage filling material so as to function as cold or warm packs for medical use.

U.S. Pat. No. 2,602,302 to Poux entitled combination Ice and Hot Pack provides an elongated rectangular body having a series of sealed spaced-apart compartments containing water or some other refrigerant fluid. The body member is described as being composed of thin rubber or plastic sheeting which allows the member to be readily flexed. The article may be prepared for use by being placed in a freezer and may be employed for therapeutic or for the heating and cooling of other articles such as foods.

U.S. Pat. No. 4,931,333 to Henry entitled Thermal Packaging Assembly describes the use of capsules having a flexible outer skin and containing a thermal controlling agent such as a refrigerant. The capsules have sloping, rounded outer surfaces and may be efficiently packed in large numbers around items to be maintained at a controlled temperature. The capsules may also be provided in a continuous sheet in bubble pack form for being wrapped around items as packing.

SUMMARY OF THE INVENTION

The present invention comprises a portable ice cooler for refrigerating food, beverages and other articles having an ice sheet of encapsulated cubes of refrigerant built into and secured along one or more of its interior walls. In the preferred embodiment the cooler includes a soft shell of flexible fabric constructed and arranged to form a container also having a lid through which access may be gained to the interior of the container. The ice sheet is deployed along one or more of the inside walls of the container. The cooler may also include one or more layers of thermal insulation extending between the outer fabric shell and the ice sheet. The ice sheet comprises a backing layer and a top layer between which the spaced apart refrigerant cubes are encapsulated in rows and columns separated by lanes. The ice sheet may be attached to the container by plurality of seams running along the lanes between said refrigerant cubes formed by threads sewn through said ice sheet for attaching the ice sheet to the container's outer shell. Alternatively, The ice sheet may be attached to the container by dividing the ice sheet into segments and using a transparent lining to form corresponding pockets in which the segments may be secured along one or more of the interior walls of the container. In the preferred embodiment the container has a rectangular cross section but have different shapes such as being cylindrical. The cooler may have a hinged top and a hinged bottom that can be pivoted or swung open for allowing access to the interior of the cooler or pivoted flat for allowing the cooler to assume a compact configuration during storage and freezing of the refrigerant cubes in a freezer compartment. The cooler may have one or more zippered pockets secured along the outside of the fabric shell and its lid may include a zipper for operating as a closure.

In another aspect of the invention a wall construction for a portable ice cooler is provided including a layer of flexible fabric constructed and arranged to serve as a generally planar foundation member and an ice sheet of refrigerant cubes that is attached to the fabric layer. The ice sheet preferably comprises a backing layer and a top layer between which the spaced apart refrigerant cubes are encapsulated in rows and columns.

In a further aspect of the invention a portable cooler is provided having a plastic insert which functions as a liner. The insert cooperates with outer shell of the cooler to form one or more narrow chambers in which ice sheets having refrigerant cubes may removeably reside along the interior walls of the cooler.

It is an object of the present invention to provide a portable ice cooler for refrigerating food, beverages and other articles that is convenient to use and that integrally incorporates refrigerant into its structure.

It is another object of the present invention to provide a portable ice cooler for refrigerating food, beverages and other articles in which the heat of fusion of the refrigerant can be used to actively cool the contents of the cooler.

It is a further object of the present invention to provide a portable ice cooler for refrigerating food, beverages and other articles that provides refrigerant in the form of a sheet of visually pleasing spaced apart ice-like cubes of refrigerant.

It is yet another object of the present invention to provide a portable ice cooler for refrigerating food, beverages and other articles in the form of a container which is lined along one or more of its walls with one or more sheets of encapsulated cubes of refrigerant.

It is also an object of the present invention to provide a wall construction for a cooler that allows the refrigerant to be efficiently incorporated into the structure of the cooler.

It is also another object of the present invention to provide a wall construction for a cooler which provides a visually pleasing display of spaced-apart ice-like refrigerant cubes which suggest a cooling function.

It is a yet further object of the present invention to provide a portable cooler in which a sheet of refrigerant cubes may be removeably secured along the interior walls of the cooler.

It is another object of the present invention to provide a portable cooler that can assume a flat and compact configuration for convenient storage and for taking up as little space as possible in a freezer during freezing of the refrigerant cubes.

BRIEF DESCRIPTION OF THE DRAWINGS

The invention may be better understood with reference to the following drawings in which like reference numbers are intended to refer to like elements.

FIG. 9 provides a perspective view of a portable cooler having a cylindrical configuration and more particularly of the outside of a closed cylindrically shaped cooler.

FIG. 10 provides a perspective view of the portable cooler of FIG. 9 with its top open and more particularly of the inside of an open cylindrical cooler showing ice sheets deployed along the inside sidewall of the cooler in accordance with the present invention.

FIG. 15 provides a perspective view of the alternative embodiment of the portable cooler of the present invention shown in of FIG. 14 with its main body folded flat and with both its top and bottom pivoted fully open.

FIG. 16 provides a cross-sectional view along lines 16-16 of FIG. 15 of the alternative embodiment of the portable cooler of the present invention shown in of FIG. 14 collapsed into a compact configuration with its main body folded flat and with both its top and bottom pivoted flat and extending inside its folded sidewalls.

DESCRIPTION OF THE PREFERRED EMBODIMENT

Figure 1:
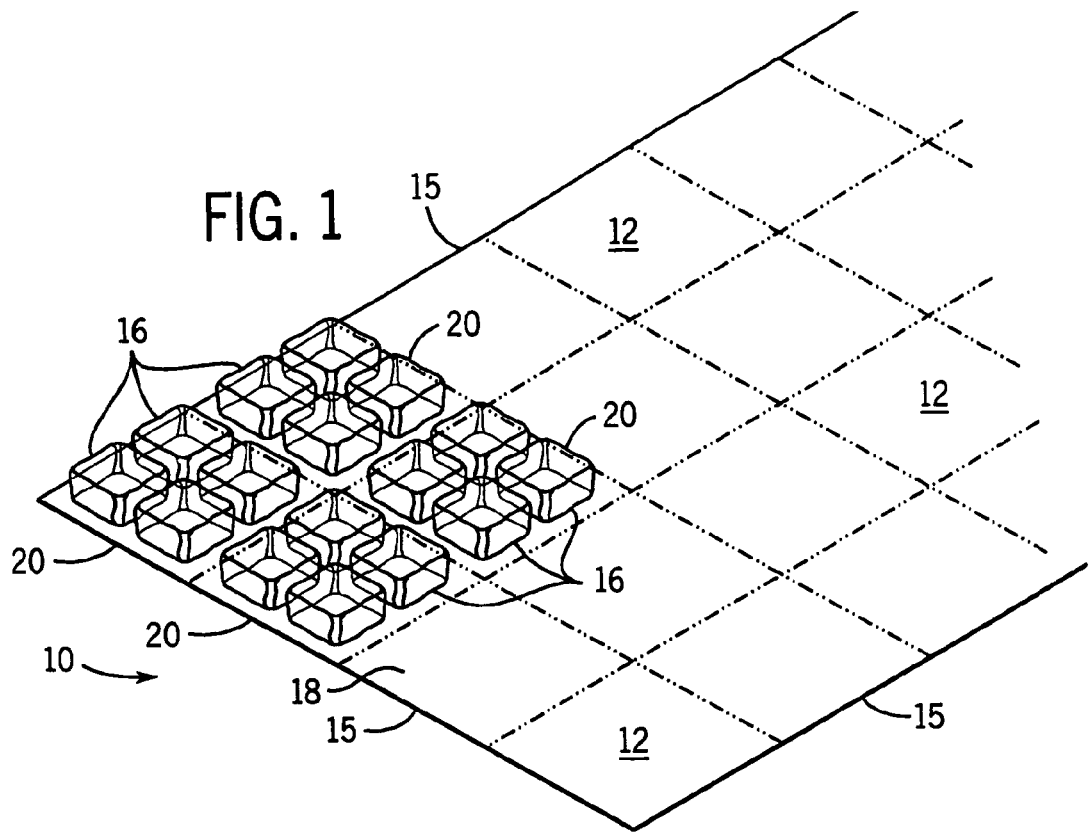
FIG. 1 provides a perspective view of a diagrammatic illustration of an ice sheet including sections or groups of multiple refrigerant cubes in accordance with the present invention.
Figure 2:
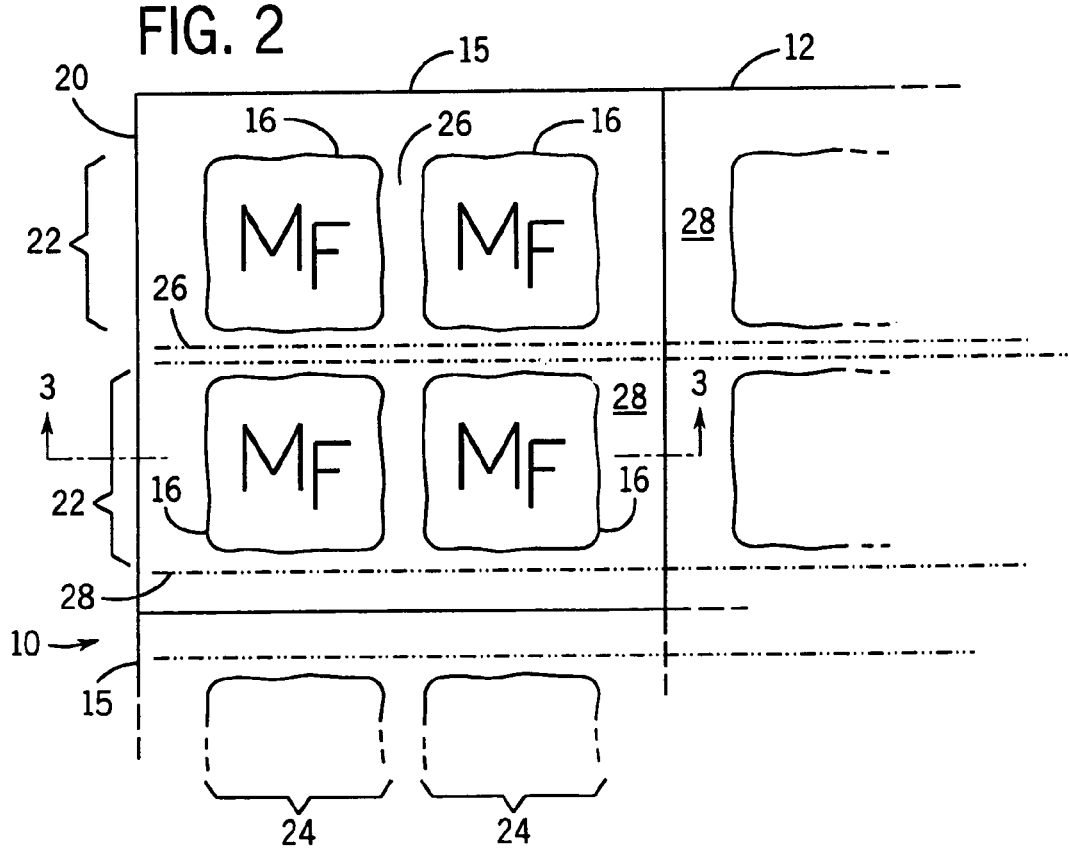
FIG. 2 provides an enlarged overhead plan view of an ice sheet shown in FIG. 1 illustrating spacing of the refrigerant cubes in accordance with the present invention.

Referring now to FIGS. 1 and 2, an ice sheet 10 is shown including a flexible but generally planar backing layer 12 and including a large number of spaced apart refrigerant cubes 16 disposed along its upper surface 18. The refrigerant cubes 16 are preferably grouped in sections 20 each of which have four cubes. The refrigerant cubes are deployed in rows 22 and columns 24 separated by lanes 26 and 28 running across the sheet 10 from its perimeter edges 15. The sectional lanes 28 running between the sections 20 of refrigerant cubes 16 are preferably somewhat wider than the other lanes between the cubes. The refrigerant cubes 16 in FIG. 2 are each shown as having a logo (the letters MF) stamped or embossed on their top surfaces.

Figure 3:
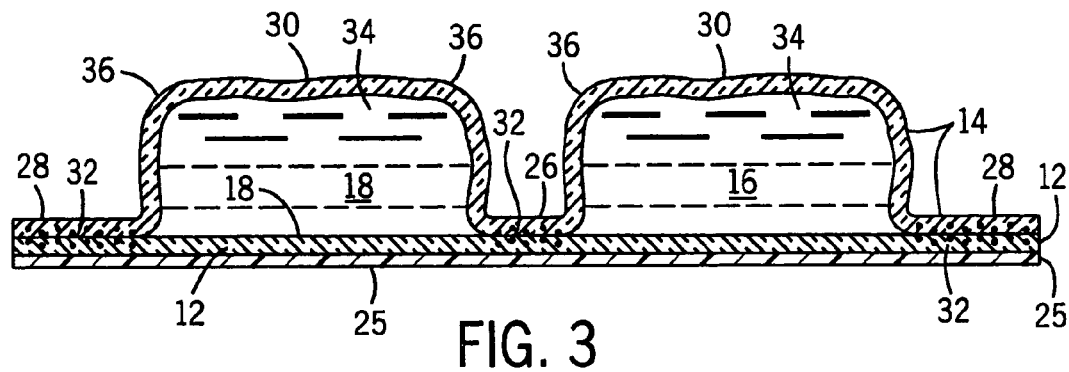
FIG. 3 provides a cross-sectional view along lines 3-3 of FIG. 2 of an ice sheet showing the details of the construction of a sheet of refrigerant cubes in accordance with the present invention.

Referring now to FIG. 3, a top layer 14 is formed into cup-shaped sections 30 and heated-sealed at joints 32 along the lanes 26 and 28 to the upper surface 18 of backing layer 12 so as to form small ice cube-like sealed compartments 34 in which the refrigerant is contained. The compartments 34 are generally cubic or prismatic in shape with rounded upper corners 36. The compartments 34 define the shapes and positions for the refrigerant cubes 16. The backing layer 12 and top layer 14 are preferably comprised of thin polyethylene films that that can be easily heat-sealed together. A very thin layer of heat reflective metal foil 25 is adhered to the far side of the backing layer opposite the cubes 16. The refrigerant preferably comprises clear water but may comprise a freezing gel solution having a somewhat lower freezing point than 32 degrees Fahrenheit. After being frozen the refrigerant cubes 16 are capable of absorbing heat energy equivalent to their heat of fusion as they melt and thereby providing a chilling effect on surrounding materials.

Figure 4:
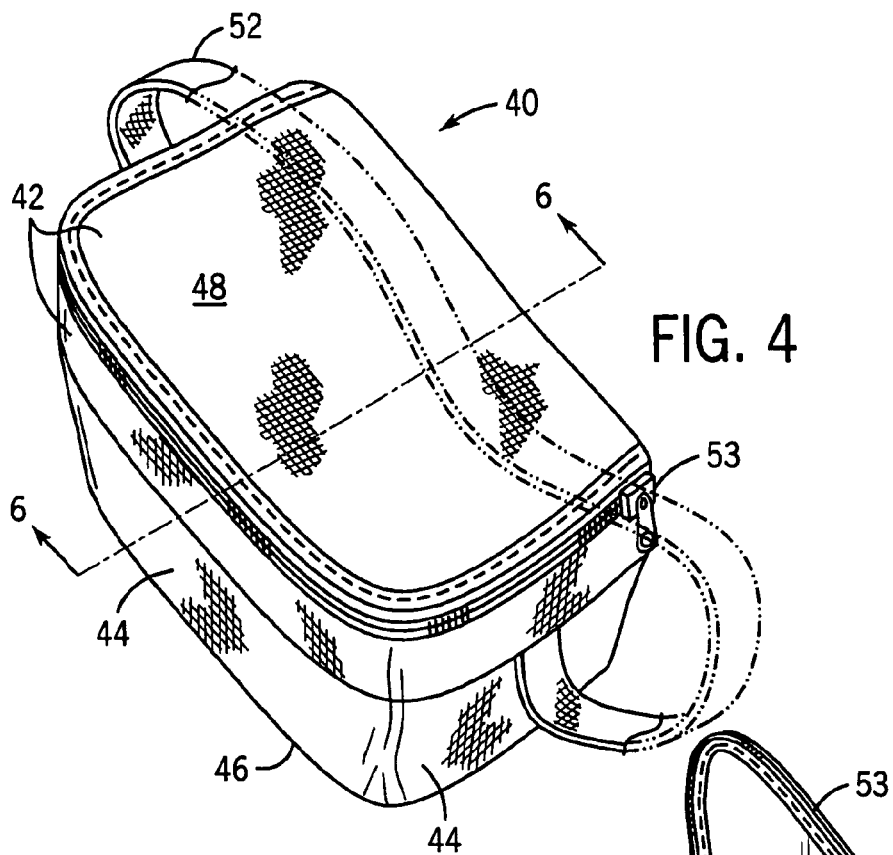
FIG. 4 provides a perspective view of a typical portable cooler having a flexible fabric outer shell and more particularly of the outside of a closed rectangular shaped cooler.
Figure 5:
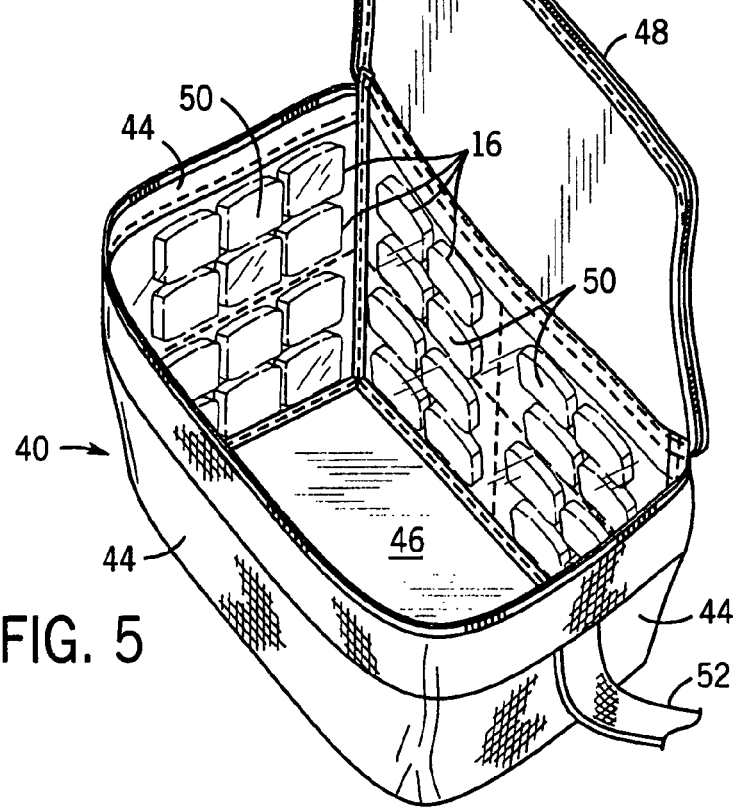
FIG. 5 provides a perspective view of the portable cooler of FIG. 4 with its top open and more particularly of the inside of an open cooler showing ice sheets deployed along the inside sidewalls of the cooler in accordance with the present invention.

Referring now to FIGS. 4 and 5, a portable cooler 40 is shown having a flexible outer shell 42 of durable fabric such as nylon. The cooler 40 includes four sidewalls 44, a bottom 46 and a lid 48 that define the rectangular structure of the container formed by the cooler 40. The cooler also includes a carrying handle 52 and a zipper 53 which extends along the top edges of the sidewalls 44 as well as along the outer edge of the lid 48. The zipper 53 acts as a closure to the cooler 40. When the zipper 53 is open the lid 48 can be tilted upward as shown in FIG. 5 so that the interior of the cooler 40 can be conveniently inspected and accessed. Ice sheets 50 including multiple refrigerant cubes 16 are attached to the interior sidewalls 44 of the cooler 40 and effectively built into the structure of the cooler 40. In preparation for use the cooler 40 is placed in a freezer or the freezer compartment of a refrigerator so that refrigerant cubes 16 can be frozen. After the refrigerant cubes 16 are solidified the cooler 40 may be taken out for use. The refrigerant cubes 16 provide active cooling or chilling of the contents of the cooler 40 during use.

Figure 6:
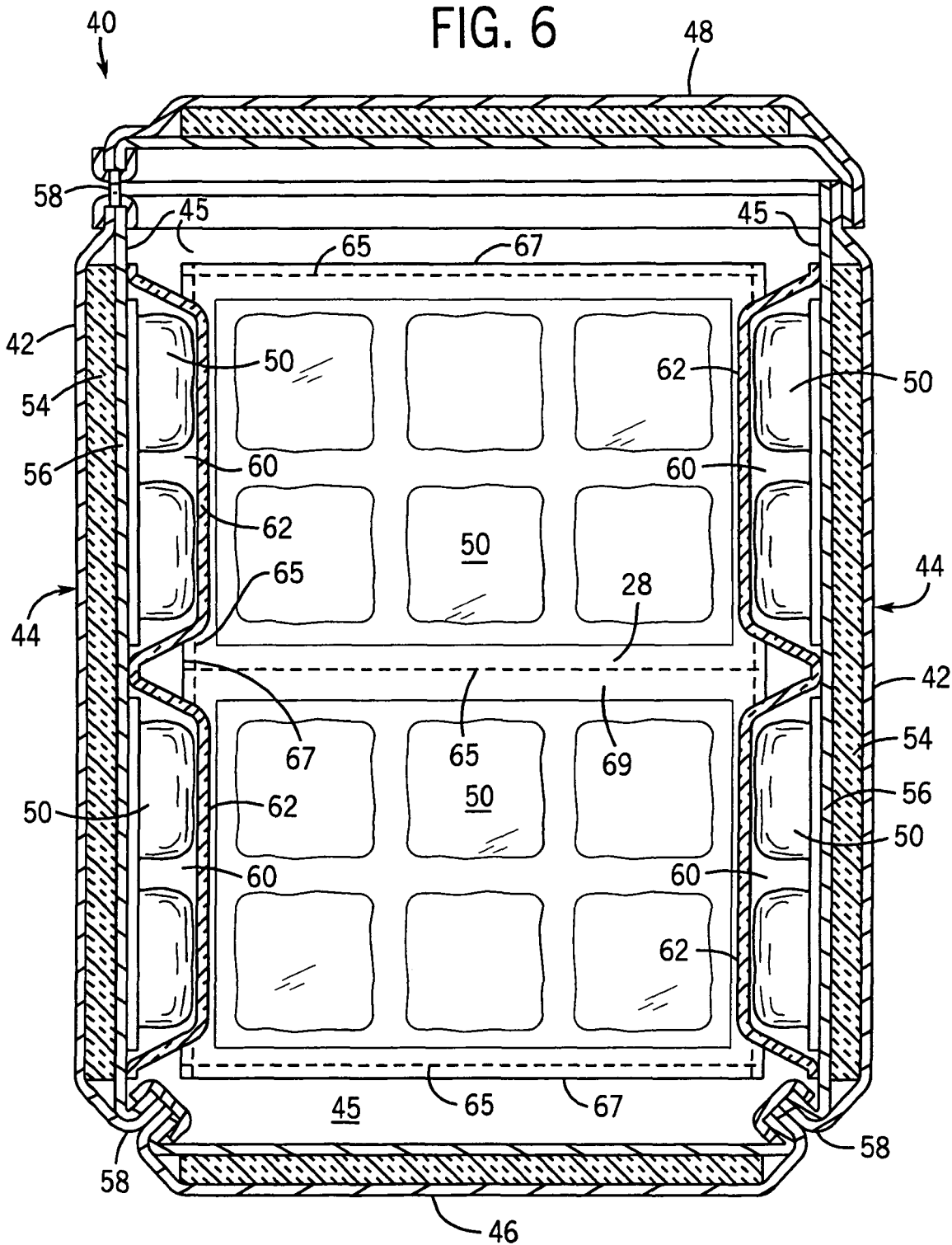
FIG. 6 provides a lateral cross-sectional view along lines 6-6 of FIG. 4 of the portable cooler illustrating the deployment of ice sheets along the inside walls of the cooler accordance with the present invention.

Referring now to FIG. 6, the sidewalls 44, bottom 46 and lid 48 of the cooler 40 each include an outer fabric shell 42, a layer 54 of thermal insulation such as polyurethane foam, and a inner lining 56 of washable plastic as shown with respect to the sidewalls 44. The sidewalls 44, bottom 46 and lid 48 are sewn and secured together at seams 58. The sidewalls 44 include the ice sheets 50 which are deployed along the interior surfaces 45 of the sidewalls 44. Segments of the ice sheets 50 are held within closed pockets 60 formed by a set of sidewall liners 62 which are secured to the sidewalls 44 by being sewn to the sidewall layers at seams 65 along their perimeter edges 67 and along the spaces 69 in between the individual ice sheets 50. The sidewall liners 62 are preferably transparent so that the refrigerant cubes are visible and the visually pleasing cooling appearance of the inside of the cooler afforded by the cubes is maintained.

Figure 7:
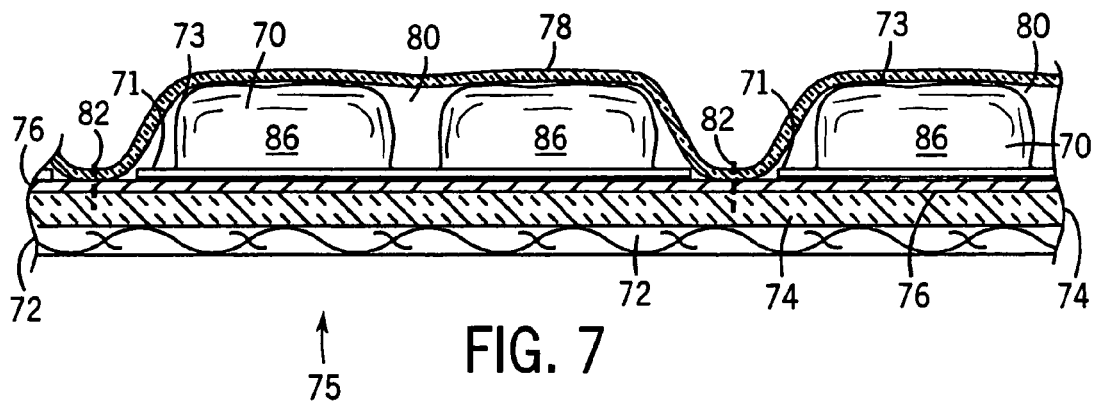
FIG. 7 provides an enlarged cross-sectional view of the typical wall for a portable cooler in accordance with the present invention illustrating the construction of the wall.

Referring now to FIG. 7, the cooler wall 75 is constructed of several layers including a fabric shell 72, an insulation layer 74, an interior plastic lining 76, ice sheets 70 and wall liner 78. The fabric shell 72 is preferably a tough and durable layer of nylon although many different types of fabrics could be employed and provides protection, structural integrity, and mechanical support. The insulation layer 74 is preferably made of polyurethane foam although many different types of thermal insulation could be employed and reduces the flow of heat into the interior of the cooler thereby helping to maintain the cooler colder for a longer period. The insulation layer 74 may also assist in providing support and structural integrity. The plastic lining 76 seals off the inside of the cooler and helps preserve cleanliness. The lining 76 may include an optional heat reflective metallic coating as further added thermal insulation. The ice sheets 70 include a backing layer 71 and a top layer 73 of polyethylene film formed to define compartments for refrigerant cubes 86. The wall liner 78 is attached to the interior lining 76 and insulation layer 74 at the seams 82 and defines the pockets 80. The seams 82 are comprised of thread sewn through the wall liner 78, the interior lining 76 and the insulation layer 74. The pockets hold the ice sheets 70 against the lining 76 thereby forming an interior wall for an ice cooler featuring active cooling of the interior contents of the cooler by the refrigerant cubes 86 of the ice sheets 70.

Figure 8:
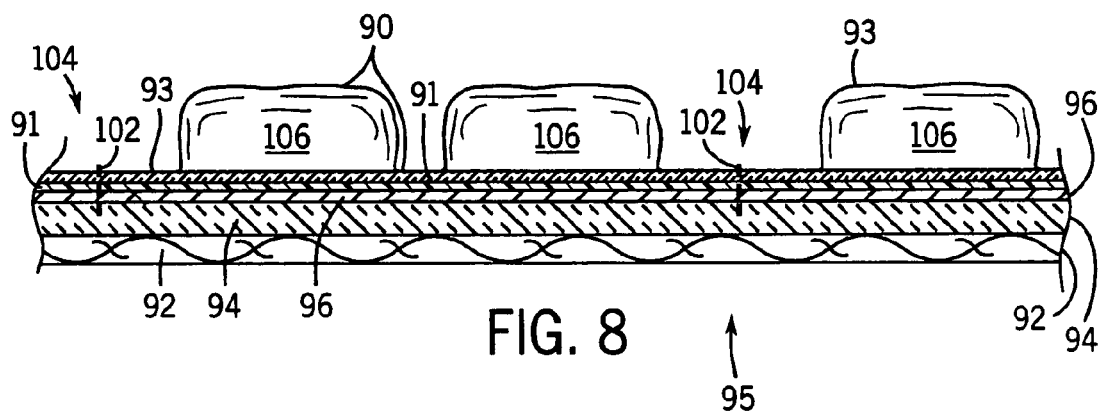
FIG. 8 provides an enlarged cross-sectional view of another typical wall construction for a portable cooler in accordance with the present invention illustrating an alternative construction for the wall.

Referring now to FIG. 8, the alternative cooler wall 95 is constructed of several layers including a fabric shell 92, a thermal insulation layer 94, an interior plastic lining 96, and ice sheet 90. The shell 92, insulation layer 94 and lining 96 are similar to the shell 72, insulation layer 74 and lining 76 of the cooler wall 75. The ice sheet 90 includes a backing layer 91 composed of a very thin sheet of heat reflective metallic foil and a top layer 93 of thin polyethylene film formed to define ice cube like compartments for the refrigerant cubes 106. In this case the ice sheet 90 is secured directly onto the lining 96 by the seams 102 which comprise thread sewn through the ice sheet 90, the lining 96 and the insulation layer 94 along the sectional lanes 104 of the ice sheet 90.

Referring now to FIGS. 9 and 10, the portable cooler 110 is cylindrically shaped and has a flexible outer shell 112 of durable fabric such as nylon. The cooler 110 also includes a cylindrically shaped unitary sidewall 114, a bottom 116 and a lid 118 that define the cylindrical structure of the container formed by the cooler 110. The cooler is adapted for chilling and storing beverage cans, bottles and the like. The cooler also includes a storage pocket 122 for miscellaneous items and two zippers 123 and 125 which extend along the top and bottom edges of the sidewall 114 as well as along the outer edge of the lid 118 and bottom 116. The zippers 123 and 125 function as a closures to the main compartment of the cooler 110. When the zipper 123 is open the lid 118 can be tilted upward as shown in FIG. 10 so that the interior of the cooler 110 can be conveniently accessed. Ice sheets 120 including multiple refrigerant cubes 136 are attached to the interior sidewalls 114 of the cooler 110 and built into the structure of the cooler 110. In preparation for use the cooler 110 is placed in a freezer or the freezer compartment of a refrigerator so that refrigerant cubes 136 can be frozen. After the refrigerant cubes 136 are solidified the cooler 110 may be taken out for use. The refrigerant cubes 136 provide active cooling or chilling of beverage cans placed in the cooler 110 during use.

Figure 11:
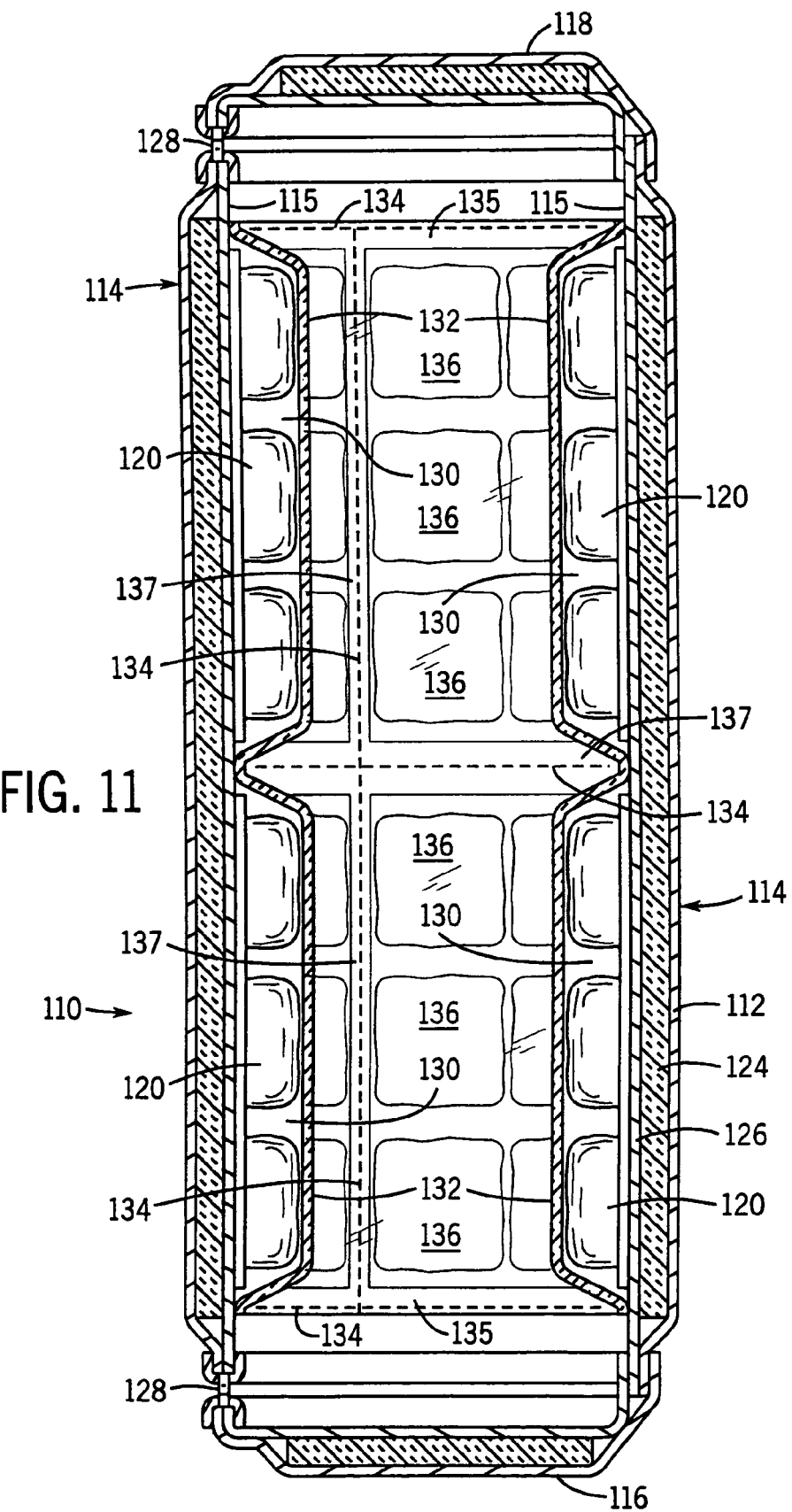
FIG. 11 provides a longitudinal cross-sectional view along lines 11-11 of FIG. 9 of the cylindrical portable cooler illustrating the deployment of ice sheets along the inside walls of the cooler in accordance with the present invention.

Referring now to FIG. 11, the sidewall 114, bottom 116 and lid 118 of the cooler 110 include an outer fabric shell 112, a layer of thermal insulation 124 such as polyurethane foam, and an inner lining 126 of washable plastic. The sidewall 114, bottom 116 and lid 118 are sewn and secured together at seams 128. The sidewall 114 includes the ice sheets 120 which are deployed along the interior surfaces 115 of the sidewall. The ice sheets 120 are held within pockets 130 formed by a set of sidewall liner 132 which are secured to the sidewall 114 by the seams 134 sewn to the sidewall layers along their perimeter edges 135 and along the spaces 137 in between the ice sheets 120. The sidewall liner 132 is preferably transparent so that the refrigerant cubes 136 are visible and the visually pleasing cooling appearance of the inside of the cooler afforded by the cubes is maintained.

Figure 12:
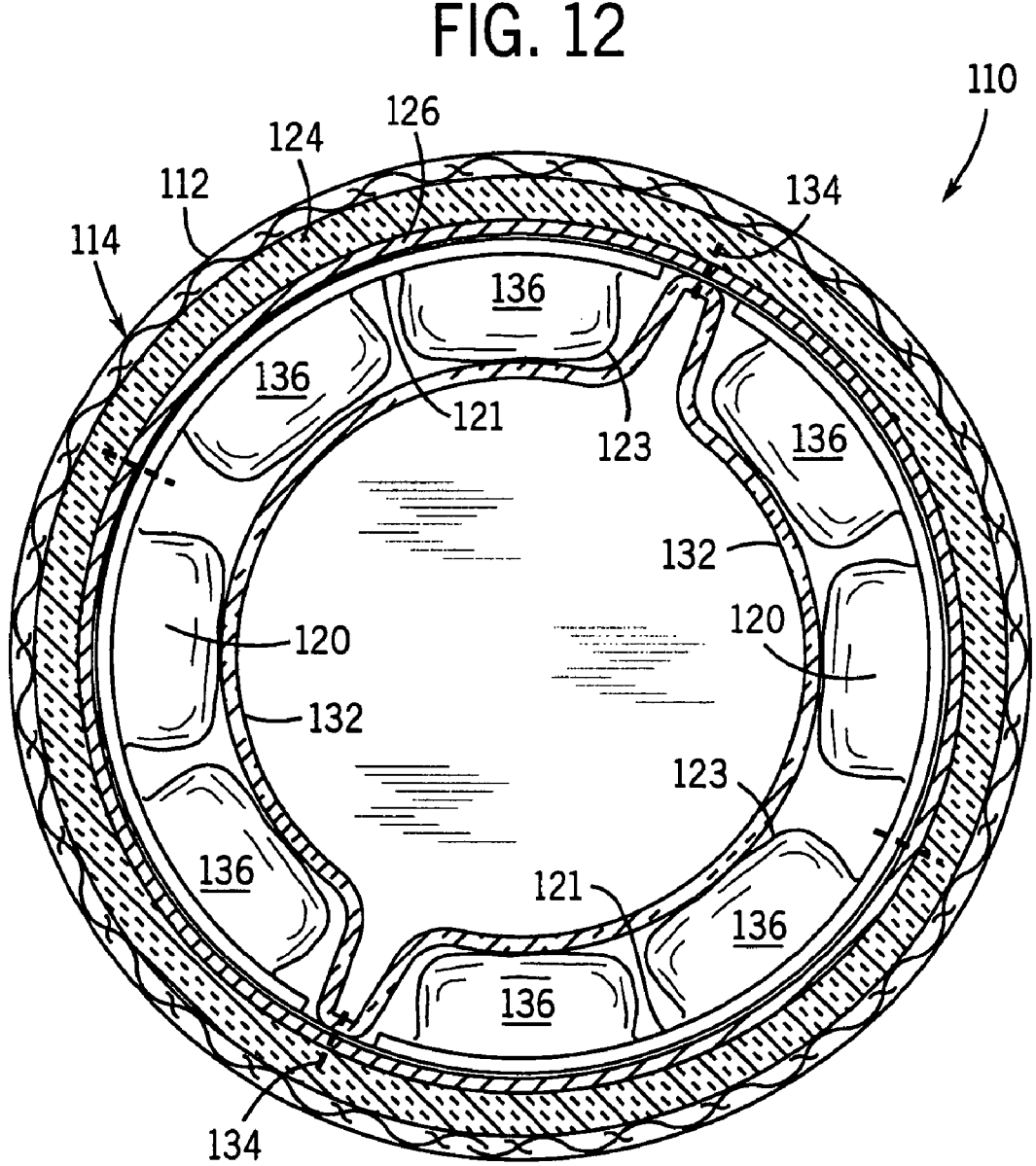
FIG. 12 provides a lateral cross-sectional view along lines 12-12 of FIG. 9 of the cylindrical portable cooler further illustrating the deployment of ice sheets and the construction of a cooler sidewall in accordance with the present invention.

Referring now to FIG. 12, the cooler sidewall 114 is constructed of several layers including a tough fabric shell 112, a thermal insulation layer 124, an inner plastic lining 126, ice sheets 120 and sidewall liners 132. The ice sheets 120 include a backing layer 121 and a top layer 123 of polyethylene film formed to define compartments for the refrigerant cubes 136. The sidewall liners 132 are attached to the interior lining 126 and insulation layer 124 at the seams 134 and define the pockets 130. The seams 134 comprise thread sewn through the sidewall liners 130, the interior lining 116 and the insulation layer 114. The pockets 130 hold the ice sheets 120 against the lining 126 thereby forming an interior wall for an ice cooler featuring active cooling of the contents of the cooler 110 by the refrigerant cubes 136 of the ice sheets 120.

Figure 13:
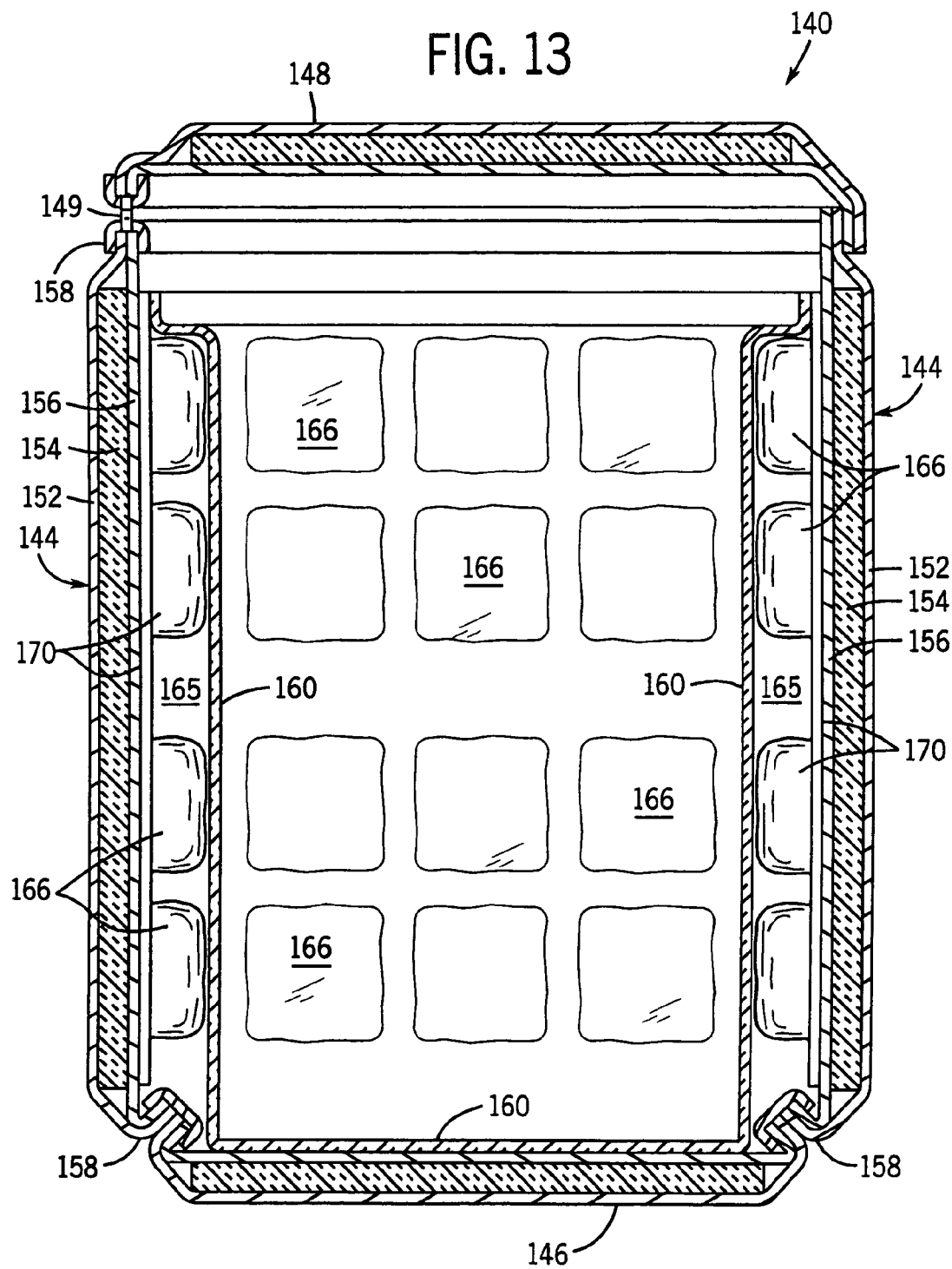
FIG. 13 provides a lateral cross-sectional view of an alternative design for a portable cooler in accordance with the present invention in which a plastic insert is used to hold the ice sheets in position along the sidewalls of the cooler.

Referring now to FIG. 13, the cooler 140 includes sidewalls 144, a bottom 146 and a lid 148 that define the rectangular structure of the cooler. The sidewalls 144, bottom 146 and lid 148 are sewn and secured together at seams 158. The lid 148 tilts up and pivots from the hinge 149 when the cooler 140 is open. The sidewalls 144, bottom 146, and lid 148 are constructed so as to each include an exterior fabric shell 152, a thermal insulation layer 154, and an interior plastic lining 156. The cooler 140 also includes plastic insert 160 that may be composed of a pliable sheet material but is preferably comprised of a hard plastic providing a rigid structure. The insert 160 has a rectangular shape conforming to the inside structure of the cooler 140 but is also slightly spaced apart from the sidewalls 144. The insert 160 retains the ice sheets 170 along the interior sides of the cooler against the lining 156 in the narrow cavity or chamber 165 along the sidewalls 144 between the insert 160 and the lining 156. The insert 160 is preferably transparent so that the refrigerant cubes 166 are visible and provide a visually pleasing appearance that is suggestive of cooling. The insert 160 is removable so that it can be cleaned and, more importantly, so that the ice sheets 170 can in turn also be removed and conveniently placed in a freezer so they can be solidified in preparation for the cooler 140 being used and reused. After the refrigerant cubes 166 are solidified they may be replaced into the cooler 140. The refrigerant cubes 166 then provide active cooling or chilling of the surrounding contents placed in the cooler 140 during use.

Figure 14:
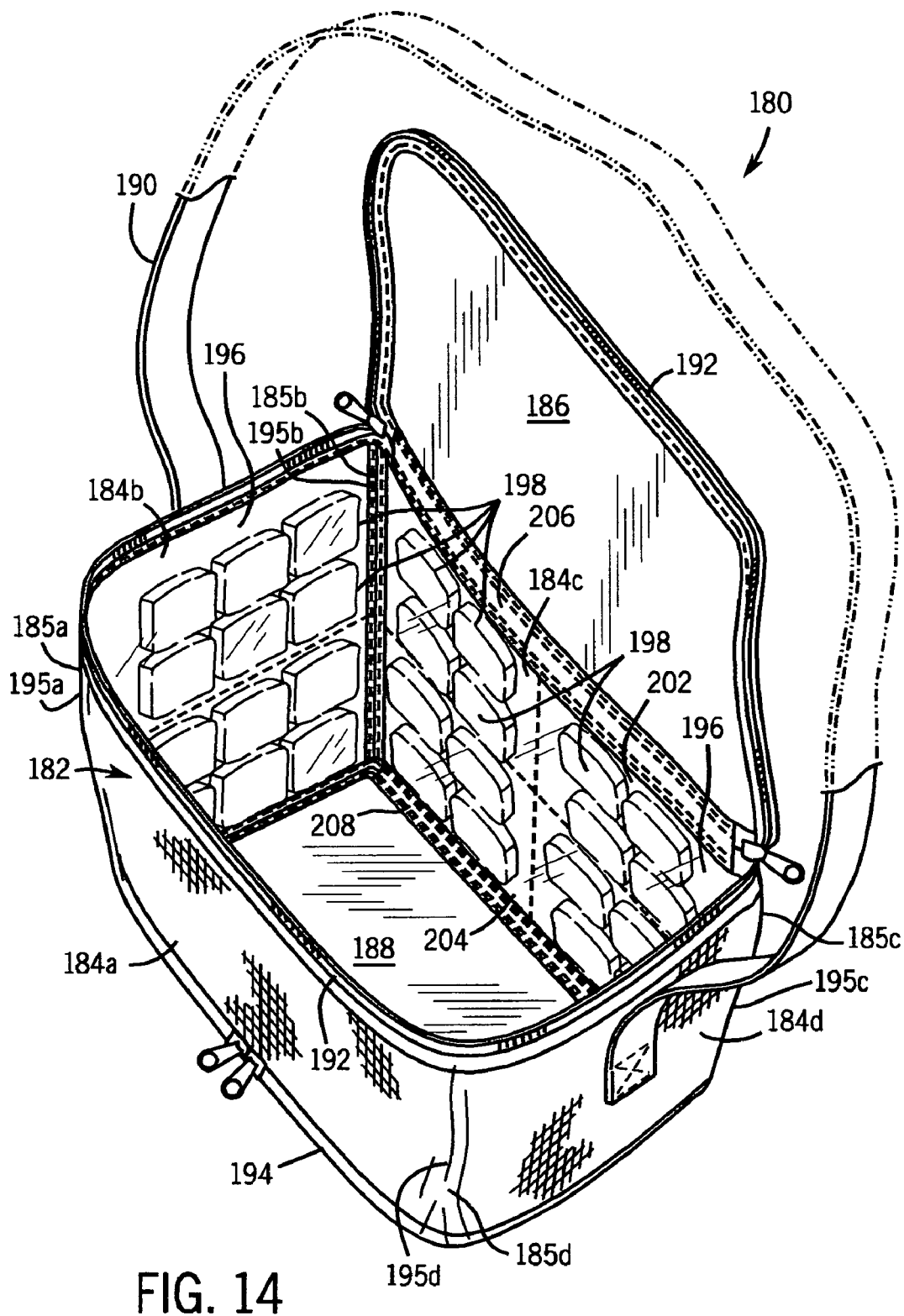
FIG. 14 provides a perspective view of an alternate embodiment of the portable cooler of the present invention having a both a top and bottom that may be opened and having its top open showing ice sheets deployed along the inside sidewalls of the cooler which are open to view.

Referring now to FIG. 14, a portable cooler 180 is shown having a flexible outer shell 182 of durable fabric such as nylon. The cooler 180 includes four separate sidewalls 184*a-d* connected at corners 185*a-d*, a top 186 and a bottom 188 that define the basic prismatic shape of the cooler 180. Ice sheets 196 including multiple refrigerant cubes 198 are attached to the interior sides of the sidewalls 184*a-d* of the cooler and are effectively built into the structure of the cooler 180. The cooler 180 also includes a carrying handle 190 of fabric attached to opposite sidewalls 184*b* and 184*d* of the cooler. Zippers 192 and 194 extend along the outer perimeter edges of the top 186 and of the bottom 188 and the corresponding top and bottom edges of the three sidewalls 184*a*, 184*b* and 184*d*. In preparation for use the cooler 180 is placed in a freezer or the freezer compartment of a refrigerator so that refrigerant cubes 198 can be frozen. After the refrigerant cubes 198 are solidified the cooler 180 may be taken out for use. During use the refrigerant cubes 198 provide active cooling or chilling of the food, beverage and other articles placed within the cooler 180.

The zipper 194 along the bottom 188 is ordinary kept closed when the cooler 180 is in use thereby allowing the bottom 188 to remain fixed in place and sealing off the inside of the cooler 180. The zipper 192 along the top 186 may be opened to allow the top to operate as a lid that can be tilted upward as shown so that the interior of the cooler 180 can be inspected and the articles inside can be conveniently accessed. When the top 186 is tilted down and closed the zipper 192 can be closed sealing off the inside of the cooler 180. The top 186 and bottom 188 are connected to the top edge 202 and bottom edge 204 of one of the sidewall 184*c* by thin flaps 206 and 208 of flexible fabric that function as simple hinges allowing the top 186 and bottom 188 to pivot with respect to the sidewall 184*c* to which they are connected. In use the top 186 may alternatively pivot upward to allow for access to the inside of the cooler 180, outward at right angles so the zipper 192 can be closed and the cooler can be sealed or parallel with the sidewall 184*c* so that it lies flat. In use the bottom 188 may alternatively pivot outward at right angles so the zipper 194 can be closed and the cooler can be sealed or parallel with the sidewall 184*c* so that it lies flat. The sidewalls 184*a-d* are connected at corners 185*a-d* by flexible seams 195*a-d* that allow the sidewalls 184*a-d* to pivot or with respect to each other and allow the structure formed by the sidewalls 184*a-d* to also fold flat.

Referring now to FIG. 15, the cooler 180 is shown with the zippers 192 and 194 opened and the top 186 and bottom 188 pivoted fully outward from and forming one hundred eighty degree angles with the sidewall 184*c* of the cooler 180. The main body 200 of the cooler 180 formed by the sidewalls 184*a-d* is folded at the seams 195*a-d* so that the inside right angles of the two corners 185*b* and 185*d* go to zero degrees and the inside right angles of the two corners 185*a* and 185*c* go to one hundred eighty degrees. The cooler 180 thereby takes on a flat configuration with the sidewalls 184*a-b* resting on top of the sidewalls 184*c-d* which constitutes one of the compact forms that the cooler can assume for storage and especially for placement in a freezer compartment during cooling and freezing of the refrigerant cubes.

Referring now to FIG. 16, the cooler 180 is shown in cross-section with the zippers 192 and 194 opened the main body of the cooler 180 formed by the sidewalls 184*a-d* again folded (as in FIG. 15) at the seams 195*a-d* so that the body of the cooler assumes a flat configuration. However, in this case the cooler 180 is shown with the top 186 and bottom 188 pivoted inward toward each other parallel with the sidewall 184*c* of the cooler 180. The top 186 and bottom 188 are sandwiched in between the folded sidewalls 184*a-d*. In effect the cooler 180 is collapsed into a flat configuration which is as compact as possible for storage and especially for placement in a freezer compartment.

Although the present invention has been described with reference to the specific embodiments described above, it should be recognized that changes may be made in the form and details of the invention as described without departing from spirit of the invention or the scope of the claims.

What is claimed is:

1. A collapsible portable ice cooler comprised of:
    four side walls consisting of:

a top layer made of polyethylene formed into cup-shaped sections for holding refrigerant;

a backing layer made of polyethylene;

wherein said top layer and said backing layer are heat sealed at joints to form a plurality of lanes between said cup-shaped sections; and a heat reflective metal foil layer attached to said backing layer; an insulation layer; and a fabric shell, said top layer, said backing layer, said heat reflective metal foil layer, said insulation layer and said fabric shell integrally molded to form the walls of said collapsible portable ice cooler;

a top having a lid with fabric layer; the fabric layer forms a flap and operates as a hinge, said hinge secured on one side to the top edge of one of said walls and said lid is pivoted from its normal position in use generally parallel with said main body in a flat collapsed configuration with said main body for storage and for freezing; and a bottom having a lid with fabric layer; the fabric layer forms a flap and operates as a hinge, said hinge secured on one side to the bottom edge of one of said walls and said lid is pivoted from its normal position in use generally parallel with said main body in a flat collapsed configuration with said main body for storage and for freezing.

2. The collapsible portable ice cooler of claim 1, wherein:
said flaps include a thin flap of flexible fabric material.

3. The collapsible portable ice cooler of claim 1, wherein:
said top and bottom are pivoted outward to form a compact flat configuration in which they are parallel and spaced apart from each other.

4. The collapsible portable ice cooler of claim 1, wherein:
said top and bottom are pivoted inward to form a compact flat configuration in which they are adjacent and overlap each other.

* * * * *